Figure 1:
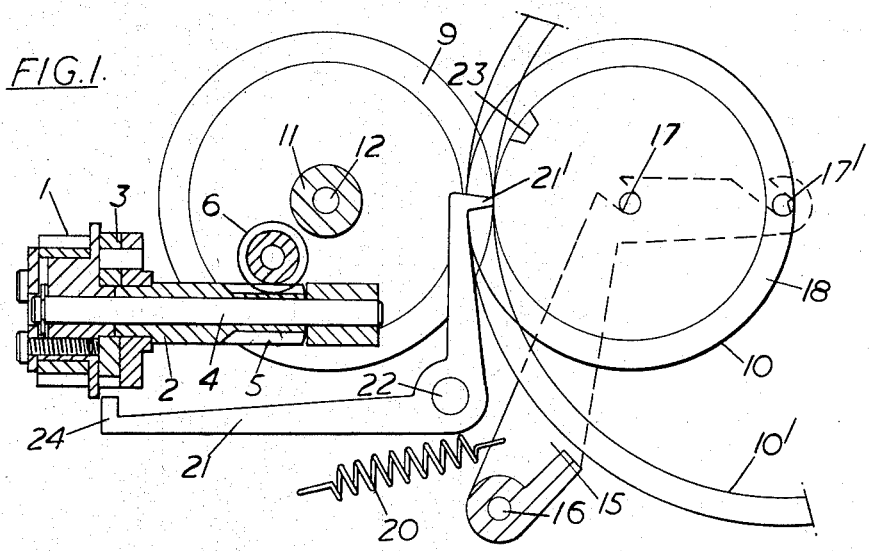

Dec. 7, 1965  G. GUSTIN  3,221,686
CONTROL CAM MECHANISM
Filed Aug. 5, 1963  3 Sheets-Sheet 1

Inventor
GIULIANO GUSTIN
By Irvin S. Thompson
Attorney

Dec. 7, 1965    G. GUSTIN    3,221,686
CONTROL CAM MECHANISM
Filed Aug. 5, 1963    3 Sheets-Sheet 2
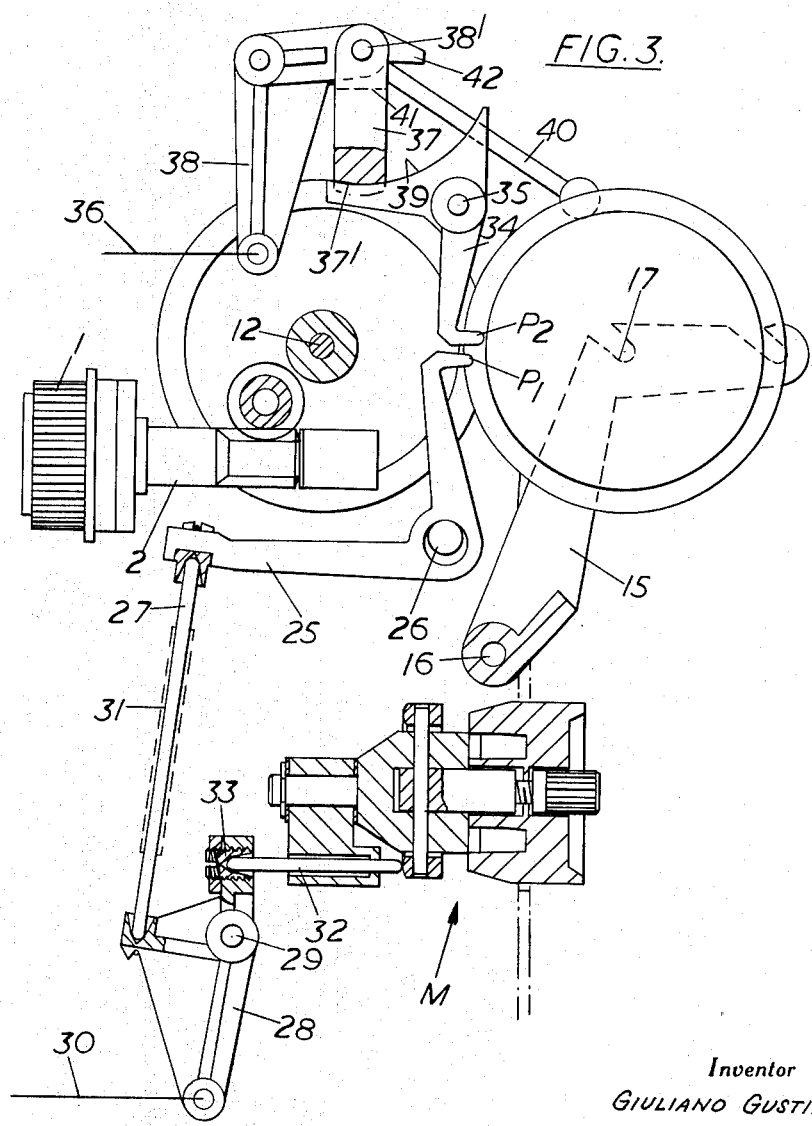
Inventor
GIULIANO GUSTIN
By Irwin S. Thompson
Attorney Dec. 7, 1965  G. GUSTIN  3,221,686
CONTROL CAM MECHANISM
Filed Aug. 5, 1963  3 Sheets-Sheet 3
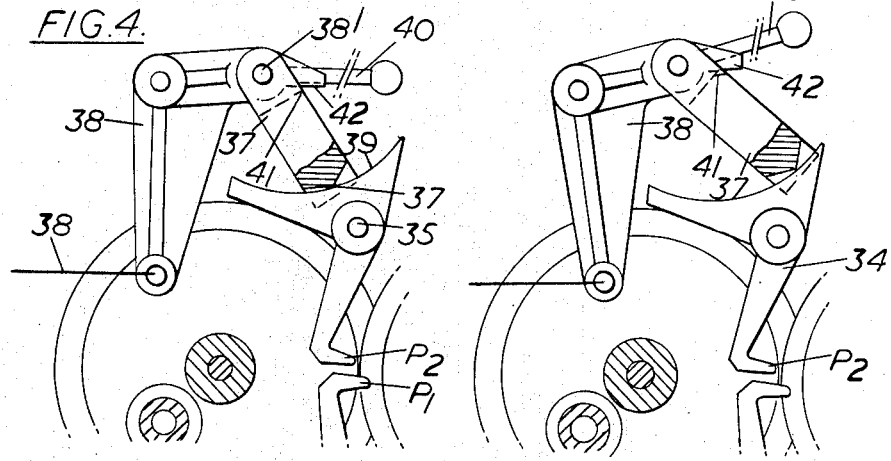
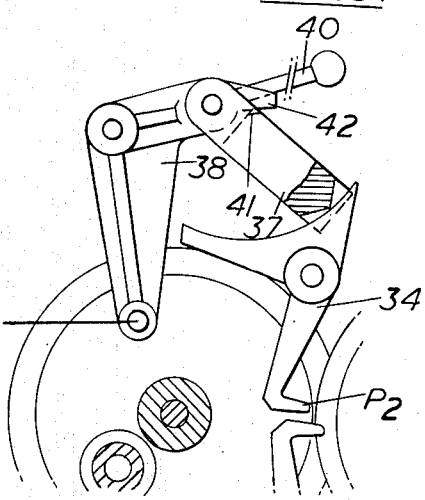
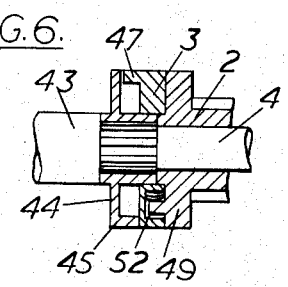
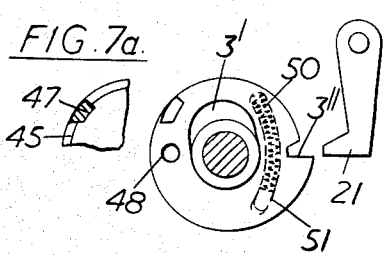
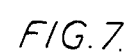
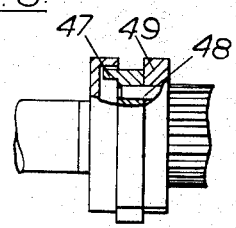
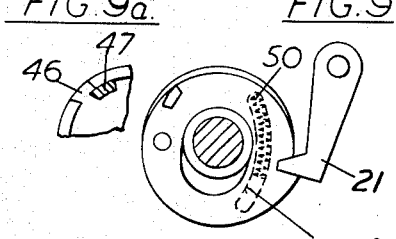
Inventor
GIULIANO GUSTIN
By Irwin J. Thompson
Attorney

United States Patent Office 3,221,686
Patented Dec. 7, 1965

3,221,686
CONTROL CAM MECHANISM
Giuliano Gustin, Piazza Tripoli 22, Milan, Italy
Filed Aug. 5, 1963, Ser. No. 300,003
Claims priority, application Italy, Aug. 6, 1962,
15,757/62
12 Claims. (Cl. 112—158)

This invention relates to cam control means for controlling and automatically synchronising the cyclic movements of a zig-zag sewing machine, in particular the movements of the footplate and of the needle-bar, of the type in which the transmission of orders, derived from at least one interchangeable cam, is effected remotely with the aid of a system of tie rods.

The said control system is characterised substantially by the feature that rotation is imparted to the cam peripherally through the intermediary of a toothed wheel fixed to the cam, the pitch circle of which coincides substantially with the basic profile of the cam, and by the feature that means are provided for supporting cams of different diameters on an axis which is movable with respect to the fixed axis of a toothed driving wheel, and means are provided for maintaining constant the distance between the said fixed axis and the basic profile of the cam.

According to a further feature of the present invention the said means for supporting the cams are preferably constituted by a pair of supporting arms which provide points of support spaced from one another by distances corresponding to the differences between the radii of the various interchangeable cams. Further, the means for maintaining constant the distance between the fixed axis of the toothed driving wheel and the basic profile of the cam are in this case constituted by at least one pair of cylindrical surfaces of rotation associated with the two toothed wheels and held in contact with one another by spring means.

The importance of being able to make use of cams of different diameters while nevertheless maintaining a constant peripheral speed with variations in diameter will be evident if we consider the cycles of motion of the cams themselves. In fact, the profile of one cam represents a given form of stitching which, with the rotation of the cam, is repeated in a cyclic manner. It is then evident that if the width of the cyclic form of stitching is not variable the length of the circumference of the cam will remain unchanged and hence its diameter; moreover, it is essential to have a constant peripheral velocity, since the result of the constant angular velocity is that the larger circumference is offset by the higher peripheral speed.

In accordance with a further feature of the present invention there are provided two toothed driving wheels rotating at constant but different speeds, the toothed wheel fixed to the interchangeable cam being capable of engaging with one or the other of the two driving wheels according to the selected speed of transmission.

Figure 2:
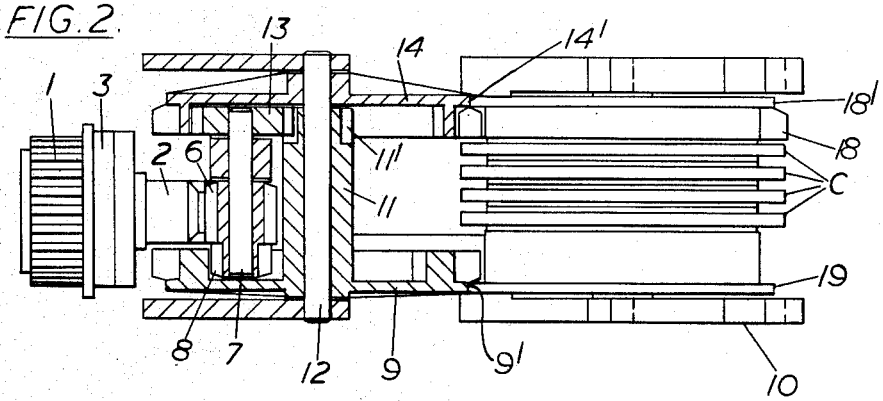

The invention will now be described in more detail with reference to the accompanying drawings, in which FIG. 1 is a view in elevation, partly in section, of the device for actuating the cam, FIG. 2 is a plan view, partly in section, of the device shown in FIG. 1, FIG. 3 is an assembly view, with parts in section, of the control mechanism, FIGS. 4 and 5 illustrate a device for limiting the amplitude of the movements derived from an abutment, in two different operating positions, FIGS. 6 and 7 illustrate in axial and transverse section respectively, a ratchet mechanism for disengaging the automatic control, shown in its operating position, FIGS. 8 and 9 are sectional views similar to those of FIGS. 6 and 7, with the pawl in the disengaged position, and FIGS. 7a and 9a show partial sectional views of FIGS. 6 and 8 respectively.

The control mechanism is actuated by a belt, not shown, through the agency of a pulley 1 (see FIGS. 1 and 2). This pulley transmits motion to the sleeve 2 via the pawl 3 the operation of which will be explained in more detail hereinafter with reference to FIGS. 6 to 9. The pulley 1 and the sleeve 2 are mounted so as to be freely rotatable on the spindle 4 fixedly mounted within the casing of the machine.

The sleeve 2 has at its end remote from the pulley 1 an endless screwthread 5 which is in engagement with a worm-wheel 6 freely mounted on a spindle 7. The latter is fixed to a pinion 8 in engagement with internal teeth of a toothed wheel 9. The external teeth of the toothed wheel 9 are adapted to set the cam 10 in rotation. The hub of the toothed wheel 9, which is freely rotatable on a spindle 12, has at one end teeth 11' in engagement with a pinion 13 freely mounted on the spindle 7. The pinion 13 in turn engages with internal teeth of a toothed wheel 14 freely rotatable on the spindle 12, the external teeth of which are also adapted to set the cam 10 in rotation.

Both of the toothed wheels 9 and 14 have, adjacent their teeth, a profile, 9' and 14' respectively, that constitutes substantially a surface of rotation the function of which will be described below.

A support 15 formed by two arms fixed to each other and capable of turning about a spindle 16 is adapted to support cams of different diameters. For this purpose it has a plurality of supporting points 17 (for example two supports 17 and 17' in the case illustrated in FIG. 1) spaced from one another by a distance substantially equal to the difference between the radii of the cams of two interchangeable banks. In FIG. 1 there is shown, as stated, a support 15 with two supporting points 17 and 17'. On the support 17 is mounted the bank of cams 10, also shown in FIG. 2, while on the support 17' can be mounted a bank of cams 10', partly shown in FIG. 1, in which the cams are of a radius double those of the bank 10.

With each bank 10 of cams is associated, at one end, a toothed wheel 18, which can be rotated either by the toothed wheel 9 or the toothed wheel 14 according to the mode of mounting of the bank 10. The toothed wheel 18 also has, like the wheels 9 and 14, an edge 18' which constitutes a cylindrical surface of rotation the profile of which corresponds substantially to the basic profile of the cams C of the bank 10. A profile 19, similar in all respects, is provided at the other end of the bank 10. The profiles 18' and 19 are disposed in such manner that when the toothed wheel 18 engages with the toothed wheel 14 they come into contact with the profiles 14' and 9' respectively. Such rolling contact permits a complete and automatic regulation of the positions of the control cams C relative to the abutments P (see FIG. 3) actuated by them. A tension spring 20 acting on the support 15 ensures proper contact during the operation of the device.

The bank 10' is constructed in exactly similar manner as regards the said contact. The analogous profiles 18' and 19, not shown, correspond to the basic profile of the cams of large diameter used in it.

With the bank just described is also associated a lever 21 with two arms which can oscillate about a spindle 22, the abutment 21' of which can enter a recess 23 provided in the bank 10. The resultant oscillations of the lever 21 effect raising and lowering of its tooth 24, causing it to obstruct the pawl 3 thereby disengaging the pulley 1.

The latter then rotates freely on the spindle 4 without driving the sleeve 2.

The cams C, which in the present embodiment are four in number, act on one of the abutments P. In FIG. 3 only two abutments are shown, a lower one $P_1$ and an upper one $P_2$, the other two being entirely similar to those shown both in shape and in the operations derived from them and being therefore omitted for the sake of clarity.

The lower abutment $P_1$ constitutes the end of one arm of a double-armed lever 25 pivoted at 26 on an eccentric spindle. This spindle permits regulation of the position of the abutment relative to the corresponding control cam. The movements of the abutment are transmitted to the pull rod 30 via the lever 25, a rod 27 and a three-armed lever 28 pivoted at 29. The pull rod 30 in turn transmits to the control mechanism the movements of the footplate, for example a system of the type described in Italian Patent No. 630,170. A tension spring 31 serves to maintain the rod 27 in contact with the arms of the levers 25 and 28 associated with it.

On one of the arms of the lever 28 there also acts a manual control indicated generally by M, for example a control of the type described in Italian patent application No. 25,857, of July 27, 1962, which comes into operation when the automatic control is disengaged by the action of the above mentioned lever $21_1$ (see FIG. 1) and no longer exerts any control on the movements of the foot plate or the needlebar. A control mechanism M in accordance with the said Italian patent application No. 25,857 has a pair of push rods 32. Each of them acts on a lever 28 via an adjusting screw 33. It should perhaps be recalled that in the system according to the present embodiment there is provided corresponding to the pair of abutments $P_1$, a pair of levers 28 of which only one has been illustrated for the sake of simplicity.

The abutment $P_2$ constitutes the end of one arm of a double-armed lever 34 pivoted at 35. The motion of the abutment $P_2$ is transmitted by the said lever to a pull rod 36 via a push rod 37 and double-armed lever 38. The push rod 37, which is mounted for oscillation at 38' on the end of one arm of the lever 38, constitutes together with the second arm of the lever 34 a device for limiting the amplitude of the movements derived from the abutment $P_2$. In fact, the second arm of the lever 34 is constituted substantially in the form of a sector with a circular profile which is concave towards the spindle 38' the axis of which, in the rest condition shown in FIG. 3, constitutes the center of the said profile. By manually moving the lever 40 it is thus possible to cause the push rod 37 to turn so as to change its point of application 37' on the profile 39. This correspondingly alters the length of the arm with which the lever 34 acts, its effective length being given by the distance between the point 37' and the axis of the spindle 35.

As indicated in FIG. 4 the push rod 37 can be turned so far as to be disposed along the line joining the axes of the spindles 35 and 38'. In this case no movement is transmitted from the lever 34 to the lever 28.

Further, by causing the push rod 37 to rotate until an edge thereon is in contact with the tooth 42 of the lever 38, movements impressed manually on the lever 40 can be transmitted to the pull rod 36 (see FIG. 5). It will be understood that all the elements so far described, one of each being illustrated in FIG. 3, are in reality duplicated corresponding to the pairs of cams for controlling the movements of the needle-bar.

In FIGS. 6, 7, 8 and 9 there is diagrammatically illustrated the ratchet 3 and its mode of operation. The control shaft 43, which in the embodiment shown in FIG. 1 is replaced by the pulley 1, is fixed to a disc 44 provided with a raised edge 45. The edge 45 has a recess 46 (better seen in FIG. 9a) in which engages the tooth 47 of the ratchet 3. The ratchet 3 is pivoted via a pin 48 on a disc 49 fixed to the sleeve 2. It can oscillate by reason of its elongated central aperture 3', about the said pin 48, against the action of a spring 50 which acts through an opening 51 between the said ratchet and a tooth 52 on the disc 49 (see FIG. 6). In the positions shown in FIGS. 6 and 7 the tooth 47 is in engagement with the recess 46 (see FIG. 7a) and is pulled by the spring 50 which tends to rotate the ratchet 3 in forward sense. When the lever 21, which is controlled by the recess 23 of the bank 10, comes into engagement with the side of the tooth 3" of the ratchet 3 it arrests the ratchet. This then rotates about the pin 48, disengaging the tooth 47 from the recess 46 (see FIGS. 8 and 9a). The disc 44 and the shaft 43 can then rotate freely, whilst the ratchet 3 and the sleeve 2 remain arrested.

The arresting of the ratchet 3 and the shaft 2 takes place in a definite angular position of the lever 21 to which corresponds a position of arrest of the entire system at an angle of predetermined phase.

In order to put the system in operation again it is sufficient to disengage the lever 21 from the tooth 3", for example imparting a slight rotation by hand to the bank 10 and causing the abutment 21' to withdraw from the recess 23. The spring 50 then returns the ratchet 3 to the position shown in FIG. 7, causing the tooth 47 to engage again with the recess 46, thereby causing the sleeve 2 to be driven by the shaft 43. The motion of the sleeve 2 recommences at the same angular phase at which it was arrested.

What I claim is:

1. In a zig-zag sewing machine, control cam mechanism comprising at least one cam for automatically controlling cyclic movements of movable members of the sewing machine, means mounting said cam for rotation, a first wheel fixed to the cam and having gear teeth thereon the pitch circle of which coincides substantially with the basic profile of the cam, a second wheel having gear teeth thereon in mesh with the teeth of said first wheel, means for rotating said second wheel, means mounting said cam for movement of its axis toward and away from the axis of said second wheel, and means for maintaining constant the distance between the axis of said second wheel and the basic profile of said cam.

2. Structure as claimed in claim 1, in which said means mounting the cam for rotation and for movement toward and away from said axis of said second wheel comprise a pair of supporting arms having supports thereon which are spaced apart from each other to permit the mounting thereon of cams of different diameters.

3. Structure as claimed in claim 1, in which said means for maintaining constant the distance between the axis of said second wheel and the basic profile of said cam comprises means having a pair of cylindrical surfaces of rotation one fixed relative to each of said wheels, and yieldable means holding said cylindrical surfaces in contact with each other.

4. Structure as claimed in claim 3, said cylindrical surfaces having diameters corresponding substantially to the pitch diameters of their respective said toothed wheels.

5. In a zig-zag sewing machine having control cam mechanism comprising at least one cam for automatically controlling cyclic movements of movable members of the sewing machine, means mounting said cam for rotation, a first wheel fixed to the cam and having gear teeth thereon the pitch circle of which coincides substantially with the basic profile of the cam, a pair of second wheels having gear teeth thereon, means mounting said second toothed wheels for rotation on a common axis, means for rotating said second toothed wheels at different angular velocities, and means for selectively engaging said first toothed wheel with either of said second toothed wheels thereby to regulate the speed of rotation of said cam.

6. Structure as claimed in claim 5, said means mounting said cam for rotation comprising means for supporting cams of different diameters on axes which are movable relative to said common axis of said second wheels.

7. Structure as claimed in claim 5, there being a plurality of said cams in unitary assembly with each other, drive means for rotating said second wheels, a ratchet for interrupting the drive to said second wheels, and means actuated by at least one of said cams for actuating said ratchet to interrupt the drive to said second wheels in a predetermined angular position of said cams.

8. Structure as claimed in claim 7, said drive means comprising a pulley for a driving belt, a fixed pivot on which said pulley is rotatable, a transmission shaft rotatable by said pulley, the pulley having a recess therein, spring means urging said ratchet into said recess, and lever means controlled by said at least one cam for disengaging said ratchet from said recess.

9. Structure as claimed in claim 1, said sewing machine having means adapted to be connected to a footplate, and at least two cams mounted for rotation with said cam and operable to vary the movements of said last named means.

10. Structure as claimed in claim 9, and a three-armed lever actuable by said at least two cams to control the movements of said last named means, one of the arms of said three-armed lever being operable to control movements of said last named means when said cams are at rest.

11. Structure as claimed in claim 1, said sewing machine having means adapted to be connected to a needle bar, there being a plurality of said cams fixed to said first wheel, at least two of said cams being operable to vary the movements of said last named means.

12. Structure as claimed in claim 11, and means for limiting the amplitude of movement of said last named means comprising a pair of double-armed levers, one arm of one lever being a cam follower and being in contact with one of said cams, one arm of the other of said levers being adapted to control said amplitude of movement, the other two arms of said two levers being interconnected for transmitting movement between them, and means for varying the amplitude of the movement between said other two arms.

References Cited by the Examiner

UNITED STATES PATENTS 3,111,099 11/1963 Nishigami _____ 112—158

FOREIGN PATENTS 1,092,282 11/1960 Germany.

ROBERT V. SLOAN, *Primary Examiner.*